(12) United States Patent
Yuzuki

(10) Patent No.: US 7,821,886 B2
(45) Date of Patent: Oct. 26, 2010

(54) METHOD AND APPARATUS FOR CONTROLLING A DISC SEEK OPERATION BASED ON A DETECTED ABNORMALITY

(75) Inventor: Shinichi Yuzuki, Kanagawa (JP)

(73) Assignee: Sony Corporation, Tokyo (JP)

( * ) Notice: Subject to any disclaimer, the term of this patent is extended or adjusted under 35 U.S.C. 154(b) by 1033 days.

(21) Appl. No.: 11/107,836

(22) Filed: Apr. 18, 2005

(65) Prior Publication Data

US 2005/0249061 A1 Nov. 10, 2005

(30) Foreign Application Priority Data

Apr. 28, 2004 (JP) .............................. 2004-134137

(51) Int. Cl.
*G11B 7/00* (2006.01)
(52) U.S. Cl. .............. 369/44.32; 369/44.27; 369/53.12; 369/30.12
(58) Field of Classification Search .............. 369/47.49, 369/47.38, 53.35, 591.17, 44.28, 44.26, 53.37, 369/53.25, 53.29, 30.15, 30.16, 30.17, 30.13, 369/44.32
See application file for complete search history.

(56) References Cited

U.S. PATENT DOCUMENTS

| | | | | |
|---|---|---|---|---|
| 4,868,819 | A * | 9/1989 | Kimura | 369/30.13 |
| 5,177,719 | A * | 1/1993 | Yamada et al. | 369/30.16 |
| 5,247,499 | A * | 9/1993 | Hayashi et al. | 369/30.13 |
| 5,247,501 | A * | 9/1993 | Hashimoto et al. | 369/44.11 |
| 5,285,431 | A * | 2/1994 | Ogawa | 369/30.15 |
| 5,371,724 | A * | 12/1994 | Uno | 360/78.14 |
| 5,748,583 | A * | 5/1998 | Baba | 369/44.28 |
| 6,157,599 | A * | 12/2000 | Yamashita et al. | 369/44.28 |
| 6,744,702 | B2 * | 6/2004 | Yonezawa | 369/30.17 |
| 6,804,176 | B1 * | 10/2004 | Komazaki | 369/30.03 |
| 2002/0080699 | A1 * | 6/2002 | Joung | 369/53.18 |

FOREIGN PATENT DOCUMENTS

| | | |
|---|---|---|
| JP | 61-264567 | 11/1986 |
| JP | 8-124180 | 5/1996 |
| JP | 11-3564 | 1/1999 |
| JP | 11-328689 | 11/1999 |
| JP | 2000-200417 | 7/2000 |

* cited by examiner

*Primary Examiner*—Hoa T Nguyen
*Assistant Examiner*—Kim-Kwok Chu
(74) *Attorney, Agent, or Firm*—Oblon, Spivak. McClelland, Maier & Neustadt, L.L.P.

(57) ABSTRACT

An optical disc device includes an optical pickup for irradiating optical discs with laser and detecting light reflected by the disc to generate received light signals, optical pickup driving means for driving the pickup radially, traverse signal generation means for generating traverse signals forming a pulse at the pickup's crossing a track by binarizing the received light signal based on binary threshold, movement control means for recognizing moving amount and speed of the pickup based on the traverse signal and controlling the optical pickup driving means based on the recognition result for the pickup's seeking to the target, and abnormality monitoring means for sending abnormality notices to the movement control means when pulse interval of the traverse signal exceeds the threshold, the movement control means, after temporarily stopping seek according to the abnormality notice, recognizes the temporary stop position for the optical pickup's seeking from the position to the target.

5 Claims, 4 Drawing Sheets

METHOD AND APPARATUS FOR CONTROLLING A DISC SEEK OPERATION BASED ON A DETECTED ABNORMALITY

CROSS REFERENCE TO RELATED APPLICATIONS

The present invention contains subject matter related to Japanese Patent Application JP 2004-134137 filed in the Japanese Patent Office on Apr. 28, 2004, the entire contents of which being incorporated herein by reference.

BACKGROUND OF THE INVENTION

1. Field of the Invention

The present invention relates to an optical disc device and, more particularly, is suitably applied to an optical disc device for performing recording and reproduction of data on and from an optical disc.

2. Description of the Related Art

Optical disc devices perform seek control using a traverse signal formed by binarizing a tracking error signal outputted from an optical pickup.

In detail, when an optical pickup is placed over a groove, a tracking error signal attains the lowest signal level, so that traverse signals, in which a "Hi" period and a "Lo" period appears alternately, can be obtained by properly setting a threshold, thereby enabling the moving speed of the optical pickup and the number of traversed tracks (seek amount) to be detected based on the traverse signals.

However, there is a case where the amplitude of a tracking error signal is reduced by various reasons such as a defect of the optical disc and dust sticking thereto. In such a case, the traverse signal continues to be at "Lo" (which is referred to as "signal skip"), so that the optical disc device makes a track count miss, in which the seek amount is erroneously recognized to be too small. Due to this track count miss, the optical pickup overruns the target and the correct address is not obtained at the intended destination track. In this case, the optical disc device generally needs to once return the optical pickup to a predetermined reference position, so as to restart seeking from the reference position, which results in a problem that the performance of the whole optical disc device is decreased.

In order to solve this problem, there has been proposed a signal processing method in which the frequency of the traverse signal is monitored, and when the frequency is remarkably increased or decreased, an abnormality is judged to have occurred, so that the seek is made to be continued by complementing the abnormal part of the traverse signal using a past average value (of several tracks, for example) of the traverse signals (see, for example paragraph 0009-0010 of Japanese Patent Laid-open No. 2003-151147).

SUMMARY OF THE INVENTION

However, the moving speed of the optical pickup may be decreased by the increase of mechanical resistance of a thread mechanism due to the change of environmental temperature, which also makes the frequency of the traverse signals lowered. Thus, there is a problem that in the above described complementing method based on the frequency variation of the traverse signals, such frequency drop which is not caused by the abnormality is erroneously recognized as an abnormality.

In addition, although it is considered that the above described complement processing of the traverse signal based on the frequency variation, can be performed in a hardware configuration and in software executed by Digital Signal Processor (DSP), there is a problem that a complicated circuit is needed when the complement processing is performed in hardware configuration, and that a high-speed DSP is needed when the complement processing is performed in software.

The present inventor has recognized the above described circumstances. According to an embodiment of the present invention, there is provided an optical disc device with a simple configuration, capable of surely performing the seek of an optical pickup at a high speed.

According to an embodiment of the present invention, there is provided an optical disc device including: an optical pickup for irradiating an optical disc with laser beam and detecting reflected light formed by the laser beam reflected by the optical disc so as to generate a received light signal; an optical pickup driving means for driving the optical pickup in the radial direction of the optical disc; a traverse signal generation means for generating a traverse signal forming a pulse at the optical pickup's crossing a track provided on the optical disc by binarizing the received light signal based on a predetermined binary threshold; a movement control means for recognizing moving amount and moving speed of the optical pickup based on the traverse signal and for controlling the optical pickup driving means based on the recognition result so as to make the optical pickup seek to a target; and an abnormality monitoring means for sending an abnormality notice to the movement control means when pulse interval of the traverse signal exceeds a predetermined pulse interval threshold, wherein the movement control means, after temporarily stopping the movement of the optical pickup according to the abnormality notice, recognizes the temporary stop position of the optical pickup, so as to move again the optical pickup from the temporary stop position to the target.

By means of an arrangement in which the seek of the optical pickup is made to be temporarily stopped when an abnormal increase of the pulse interval of the traverse signal is detected, and to be restarted after recognition of the present position of the optical pickup, the configuration can be simplified as compared with the controlling method in the past in which an abnormality is detected based on the frequency of the traverse signal and the seek is made to be continued by complementing the traverse signals, and the seek time can also be reduced as compared with the case where the optical pickup is made to return to a reference position so as to restart the movement.

According to an embodiment of the present invention, there is provided an optical disc device with a simple configuration, which is capable of preventing the track count miss caused by the signal skip in the traverse signal, so as to make the overrun of the optical pickup surely avoided, and to make the optical pickup surely seek at a high speed.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Preferred embodiments of the present invention will be described below with reference to the accompanying drawings:

(1) The Whole Configuration of the Optical Disc Device

Figure 1:
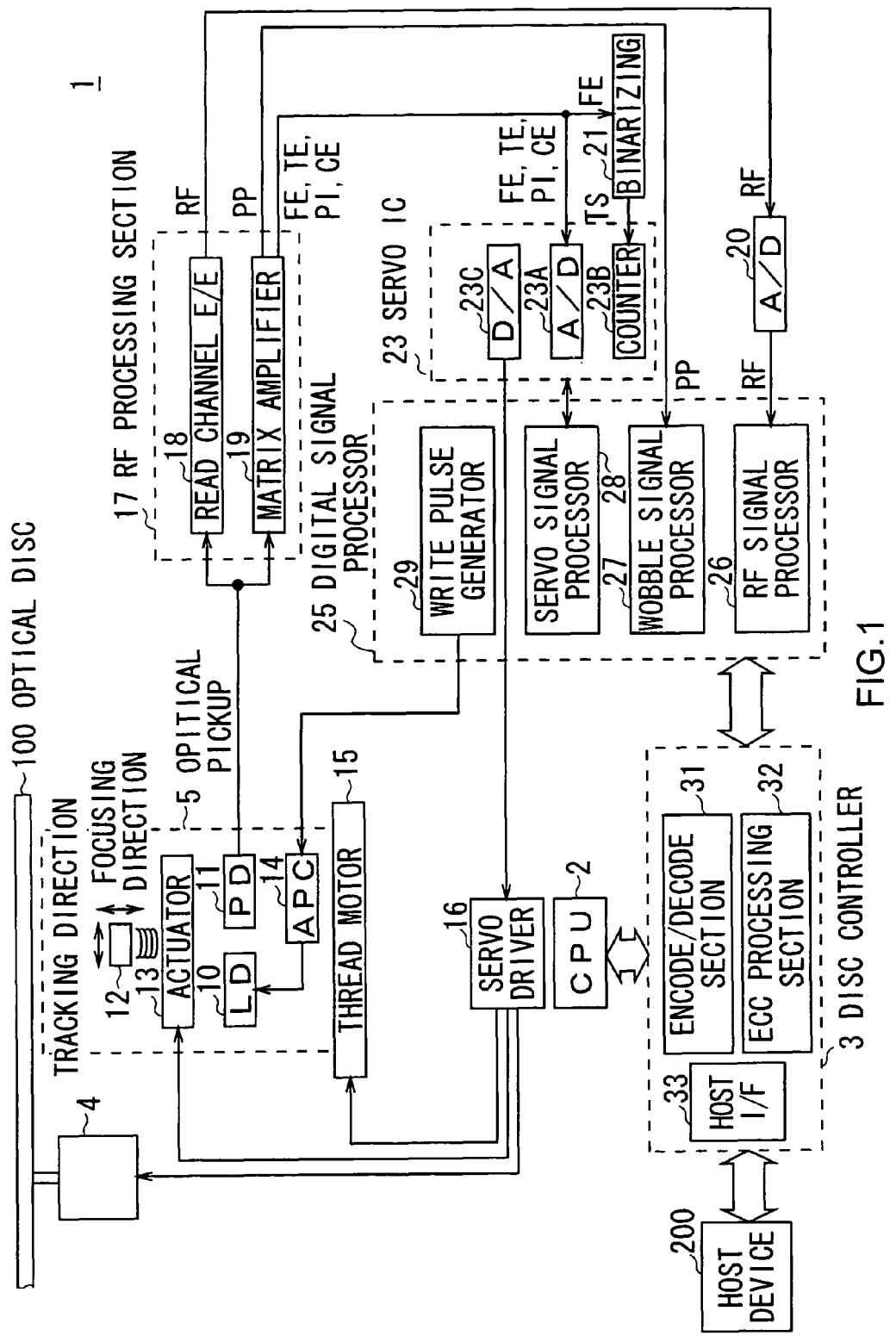
FIG. 1 is a block diagram showing a whole configuration of an optical disc device.

In FIG. 1, reference numeral 1 denotes an optical disc device as an information reproducing apparatus as a whole, in which CPU 2 is arranged to generally control the whole disc device 1 via a disc controller 3. The optical disc device 1 is also arranged to operate in accordance with a read/write command supplied from a host device 200 so as to perform recording and reproduction of data on and from an optical disc 100 as a recording medium.

The optical disc 100 is mounted on a turntable (not shown), and is rotatably driven by a spindle motor 4 as a driving means at the time of recording and reproducing. Data recorded on the optical disc 100 and Address In Pre Groove (ADIP) information provided for wobbling grooves are read out by an optical pickup 5.

The optical pickup 5 is provided with a laser diode 10 serving as a laser beam source, a photodetector 11 for detecting reflected light, a biaxial actuator 13 for holding an objective lens 12 serving as a laser beam output end, Auto Power Control (APC) circuit 14 for performing output control of the laser diode 10 and an optical system (not shown) which irradiates a disc recording surface with the laser beam via the objective lens 12, and leads the reflected light to the photodetector 11.

The biaxial actuator 13 includes a tracking actuator which moves the objective lens in the tracking direction, and a focus actuator which moves the objective lens in the focusing direction. A thread motor 15 serving as an optical pickup driving means drives the whole optical pickup 5 back and forth in the radial direction of the optical disc in accordance with control of a servo driver 16.

The photodetector 11 is provided with a plurality of photodiodes, each of which receives reflected light from the optical disc 100, so as to subject the received light to the photoelectric conversion, and generates a received light signal corresponding to the received light quantity, so as to supply the received light signal to a RF processing section 17.

A read channel front end 18 of the RF processing section 17 generates a reproduced RF signal from the received light signal, and supplies the reproduced RF signal to an analog-to-digital converter 20. The analog-to-digital converter 20 digitally converts the reproduced RF signal, and supplies the digitally converted signal to a RF signal processor 26 of a digital signal processor 25.

On the other hand, a matrix amplifier 19 performs a matrix arithmetic operation on the received light signal from each photodiode, so as to generate a push-pull signal PP with information provided for the wobbling grooves, a focus error signal FE, a tracking error signal TE, a pull-in signal PI indicating the total quantity of light reflected from the disc, and a center error signal CE indicating the inclination of the biaxial actuator 13.

A wobble signal processor 27 decodes the push-pull signal PP, and extracts the ADIP information consisting of address information, physical format information, etc., so as to supply the ADIP information to CPU 2.

On the other hand, a binarizing device 21 serving as the traverse signal generation means generates a traverse signal TS formed by binarizing the tracking error signal TE, and supplies the traverse signal to a servo IC 23. The servo IC 23 digitally converts by an analog-to-digital converter 23A incorporated therein the focal error signal FE, the tracking error signal TE, the pull-in signal PI, the center error signal CE and the traverse signal TS, so as to generate various kinds of servo drive signals Drvs based on these signals and the traverse signal TS, in accordance with control of a servo signal processor 28, and then converts the servo drive signals Drvs into analog signals by a digital-to-analog converter 23B so as to supply the converted servo drive signals to the servo driver 16. The servo driver 16 drives the biaxial actuator 13, the thread motor 15, and the spindle motor 4 based on the servo drive signals Drvs.

The RF signal processor 26 applies a decoding process to the reproduced RF signal read out from the optical disc 100 to generate reproduced data, and supplies the reproduced data to the disc controller 3.

The disc controller 3 includes an encode/decode section 31, an Error Correcting Code (ECC) processing section 32 and a host interface 33.

In the disc controller 3 at the time of reproduction, the reproduced data supplied from the RF signal processor 26 is subjected to decode processing in the encode/decode section 31 and then to error correction processing in the ECC processing section 32, so as to be transmitted to the external host device 200 (for example, personal computer etc.) via the host interface 33.

The encode/decode section 31 of the disc controller 3 extracts sub-code information, address information, and also management information, additional information from the information obtained by the decode processing so as to supply such extracted information to CPU 2.

CPU 2 performs recording operation on the optical disc 100 in accordance with a write command from the host device 200.

That is, in the disc controller 3 at the time of recording, the record data supplied from the host machine 200 is additionally provided with an error correction code in the ECC processing section 32 and subjected to RLL encoding in the encode/decode section 31 so as to be encoded to a RLL(1,7) code, and thereafter supplied to a write pulse generator 29 in the digital signal processor 25.

The write pulse generator 29 applies processes of waveform shaping etc. to the record data so as to generate laser modulation data, and supplies the laser modulation data to the APC circuit 14. The APC circuit 14 drives the laser diode 10 in accordance with the laser modulation data, so as to write the data on the optical disc 100.

(2) Seek Control of the Optical Pickup

When a read/write command is sent from the host device 200 to the optical disc device 1, the optical disc device 1 reads the present address to grasp the present position of the optical pickup 5, and calculates the number of physical tracks for seek for moving the optical pickup 5 to a target from the difference between the present address and the target address of the seek destination.

The optical disc device 1, while driving the thread motor 15 and moving the optical pickup 5 in the direction of the target, counts the number of pulses of the traverse signal TS so as to successively grasp the number of trucks on which the optical pickup 5 has moved, and moves the optical pickup 5 to the target by making the pulse number count value correspond to the number of physical tracks for seek.

At this time, the optical disc device 1 changes the spindle rotational speed and the read clock in accordance with the position of the target so as to be able to start reading immediately after the optical pickup 5 reaches the target. That is, when the driving method of the optical disc 100 is a Constant Linear Velocity (CLV) method, the spindle rotational speed is changed in accordance with the position of the target, and when the driving method is a Constant Angular Velocity (CAV) method, the read clock is changed in accordance with the position of the target.

The thread motor 15, for which a DC motor having a servo band of several tens Hz is used, is not able to perform very precise seek control, so that when the thread motor 15 is excessively driven in a short distance seek operation, the statically determination characteristic of the servo motor is deteriorated so as to increase the seek time. For this reason, the optical disc device 1 makes a selection from three control methods of the long distance seek, the middle distance seek and the short distance seek, in accordance with the value of the number of physical tracks for seek (namely, seek distance), so as to perform the seek control.

In the long distance mode, the optical pickup 5 is accelerated to a moving speed set in accordance with the seek distance and is moved at a constant speed after reaching the set moving speed. When the target is approached, the optical pickup 5 is then made to be decelerated so as to eventually reach the target. At this time, the optical disc device 1 is arranged to apply a speed servo to the biaxial actuator 13 for a predetermined period after the initiation and before the termination of the seek, thereby enabling the frequency and the pulse interval of the traverse signal Ts to be maintained within a predetermined range even in the low speed area after the initiation and before the termination of the seek.

Here, as described above, the traverse signal TS is a signal obtained by binarizing the analog tracking error signal TE. For this reason, when the amplitude of the tracking error signal TE is decreased due to a defect of the optical disc 100 and dust sticking thereto etc., the signal skip occurs in which the value of the traverse signal TS remains to be "Lo" despite the fact that the optical pickup 5 is actually crossing the track.

When the signal skip occurs, the track count miss which causes the seek amount to be erroneously recognized to be too small, occurs in the optical disc device 1, as a result of which the optical pickup 5 overruns the target. Since neither spindle rotational speed nor the read clock is right at the place to which the optical pickup has overrun, the address cannot be read correctly. In this case, in the optical disc device in the past, the optical pickup is returned to the seek starting position so as to restart seeking (retry of seek), as a result of which the performance of the whole optical disc device is lowered.

On the other hand, in the optical disc device 1 according to an embodiment of the present invention, the pulse interval of the traverse signal TS is monitored during the seek, and when the pulse interval becomes longer than a predetermined pulse interval threshold, the movement of the optical pickup 5 is stopped because there is a possibility that the signal skip has been occurred.

The optical disc device 1 estimates the present position of the optical pickup 5 based on the pulse number count value (which corresponds to the number of trucks on which the optical pickup has moved) of the traverse signal TS at the time when the pulse interval of the traverse signal TS exceeded the pulse interval threshold, so as to read the address, and recalculates the number of physical tracks for seek from the movement stopping position to the target so as to continue seeking, thereby making the optical pickup 5 reach the target.

In this way, the optical disc device 1 is arranged to prevent the optical pickup 5 from overrunning due to the signal skip and to avoid the retry of the seek.

Here, the pulse interval of the traverse signal TS is also changed by a cause which is not the abnormality, such as the increase in mechanical resistance of the thread mechanism due to the change of environmental temperature. For this reason, it is necessary to properly set the above described pulse interval threshold such that the variation of the pulse interval due to such cause other than the actual abnormality cannot be detected. In the present embodiment, the pulse interval threshold value is set to be 10 times the standard value of the pulse interval of the traverse signal TS during the seek.

(3) Processing of CPU and the Servo Signal Processor in the Seek Control

Figure 2:
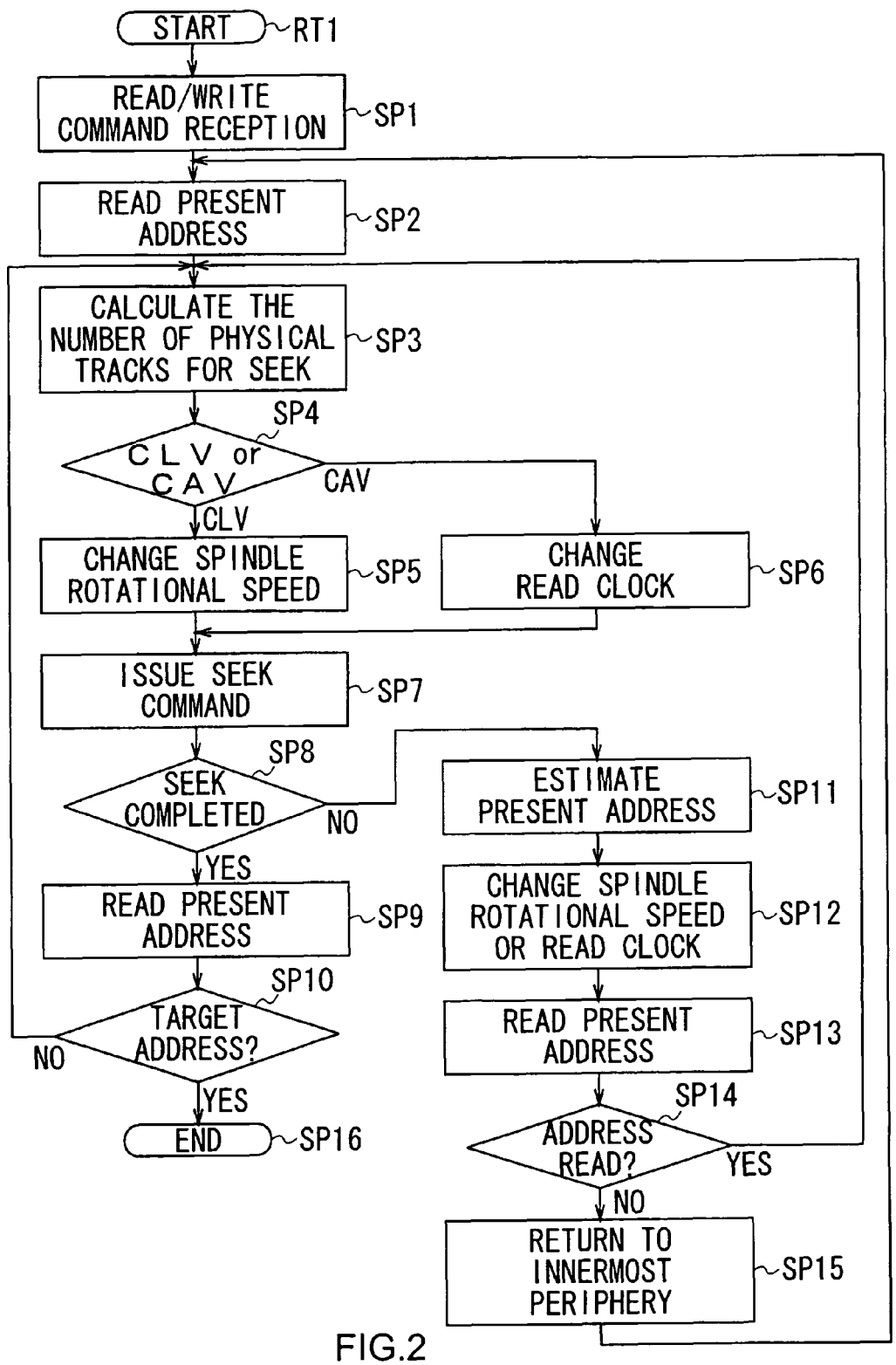
FIG. 2 is a flow chart showing a seek control processing procedure performed by CPU.

In the optical disc device 1 according to an embodiment of the present invention, CPU 2 and the servo signal processor 28 as movement control means cooperate with each other so as to perform the above described seek control of the optical pickup 5. First, the seek control processing procedure performed by CPU 2 is explained with reference to a flow chart shown in FIG. 2.

After entering the start step of the CPU seek control processing procedure routine RT1, CPU 2 moves to step SP1, and waits for a read/write command from the host device 200, and when receiving the read/write command, moves to the following step SP2.

In step SP2, CPU 2 reads the present address so as to grasp the present position of the optical pickup 5 and moves to step SP3, and then calculates the number of physical tracks for seek based on the present address and the target address of the seek destination, and moves to the following step SP4.

In step SP4, CPU 2 determines whether the driving method of the optical disc 100 is CLV or CAV. When the driving method is determined to be CLV in step SP4, CPU 2 moves to step SP5 and changes the spindle rotational speed serving as a read condition in accordance with the target address, and then moves to the following step SP7. On the other hand, when the driving method is determined to be CAV in step SP4, CPU 2 moves to step SP6 and polarizes the read clock serving as a read condition in accordance with the target address, and then moves to the following step SP7.

In step SP7, CPU 2 sends a seek command to the servo signal processor 28 and moves to the following step SP8, and waits for a notice indicating an execution result of the seek command.

The servo signal processor 28 makes the optical pickup 5 seek in accordance with the seek command. When the optical pickup 5 has completed moving the distance specified by the number of physical tracks for seek and normally read the address at the movement destination, the servo signal processor 28 returns the notice of "seek completed" to CPU 2. On the other hand, when detecting the signal skip error during the movement of the optical pickup 5, the servo signal processor 28 makes the optical pickup 5 stop seeking and returns to CPU 2 the notice of "seek error generated" and the number of trucks on which the optical pickup 5 has moved until the time of detection of the signal skip error.

When receiving the notice of "seek completed" in step SP8, CPU 2 moves to step SP9, and reads the present address so as to grasp the present position of the optical pickup 5, and moves step SP10.

In step SP10, CPU 2 determines whether the present address of the optical pickup 5 read in step SP9 corresponds to the target address. When obtaining the negative result in step SP10, which means that the optical pickup 5 has not yet reached the target, CPU 2 returns to step SP3 and recalculates the number of physical tracks for seek so as to continue seeking.

On the other hand, when obtaining the affirmative result in step SP10, which means that the optical pickup 5 has reached the target as a result of the seek, CPU 2 moves to step SP16 so as to end the processing.

Alternatively, when receiving the notice of "seek error generated" in step SP8, CPU 2 moves to step SP11 and estimates the address of the present position of the optical pickup 5 based on the number of trucks on which the optical pickup 5 has moved and which number of trucks is returned from the servo signal processor 28, and then moves to the following step SP12.

In step SP12, CPU 2 changes the read condition (spindle rotational speed in the case of CLV, read clock in the case of CAV), in accordance with the estimated present address of the optical pickup 5 and moves to step SP13 so as to read the address.

In the following step SP14, CPU 2 determines whether it has read the address. When obtaining the affirmative result in step SP14, which means that CPU 2 has read the address because the present address of the optical pickup is correct, CPU 2 moves to step SP3 and recalculates the number of physical tracks for seek based on the read out present address and the target address of the seek destination, so as to continue seeking.

On the other hand, when obtaining the negative result in step SP14, which means that CPU 2 has not read the address because the estimated present address of the optical pickup 5 is not correct, and that CPU 2 has missed the present position of the optical pickup 5, CPU 2 moves to step SP15, and makes the optical pickup 5 move to the innermost peripheral reference position, and then returns to step SP2 so as to resume seeking from the reference position.

Figure 3:
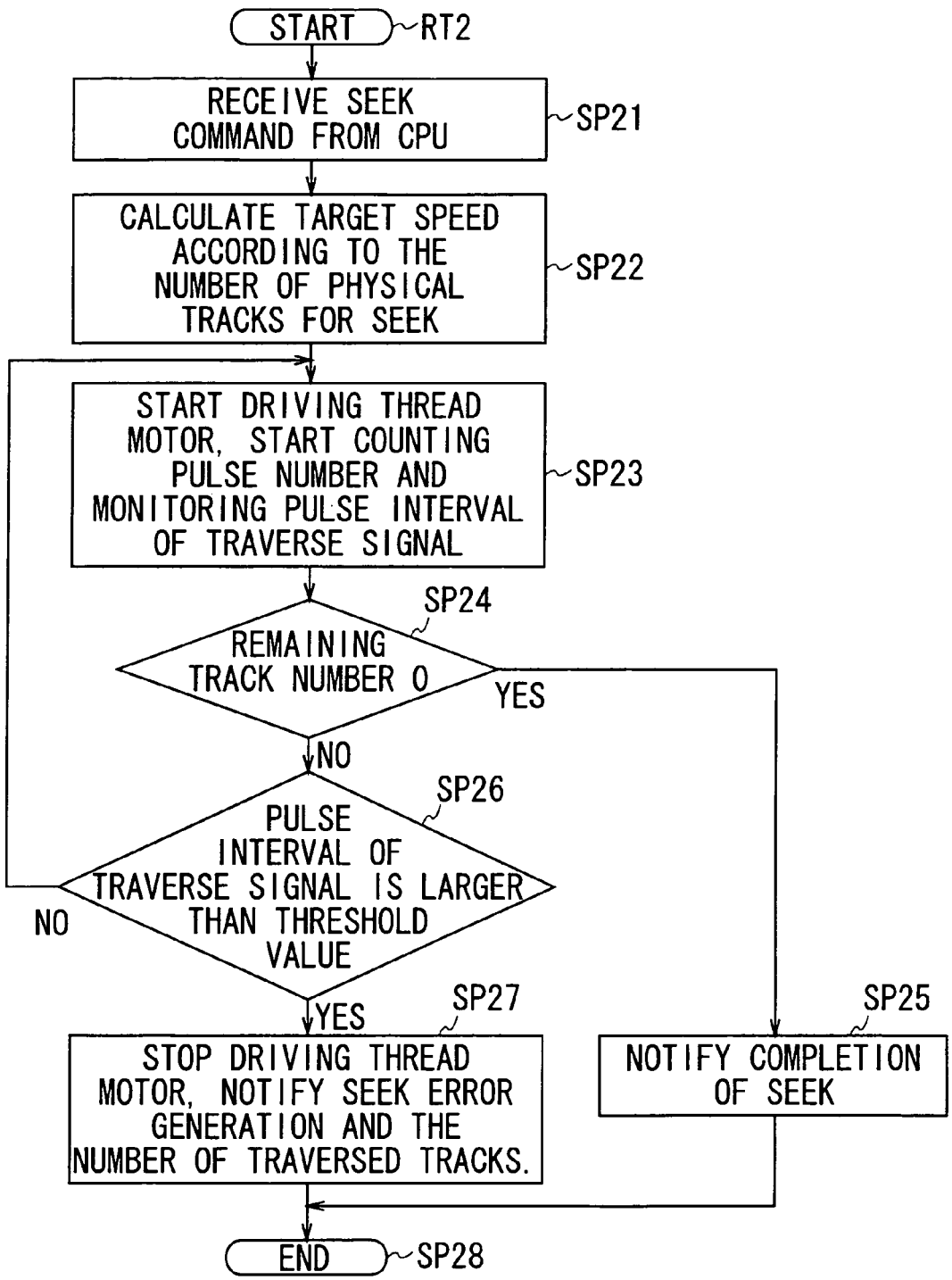
FIG. 3 is a flow chart showing a seek control processing procedure performed by a servo signal processor.
Figure 4:
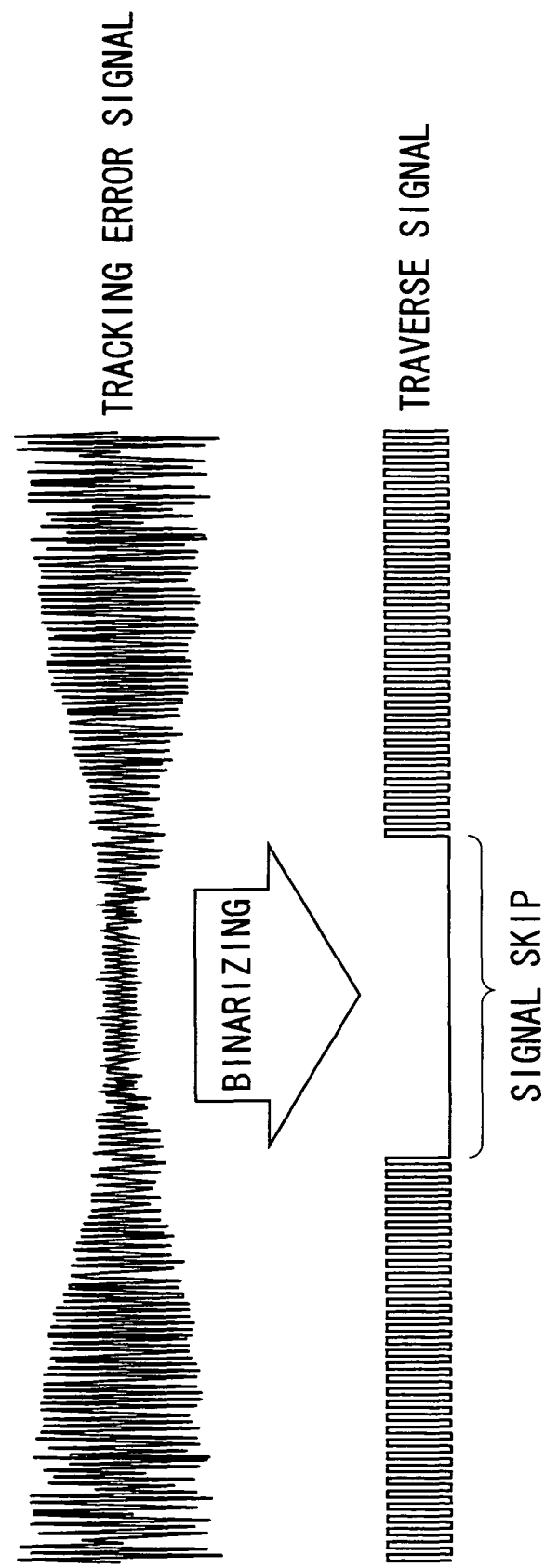
FIG. 4 is a characteristic curve chart for explaining the signal skip in the traverse signal.

Next, the seek control processing procedure performed by the servo signal processor 28 is explained with reference to a flow chart shown in FIG. 3.

The servo signal processor 28, after entering the start step of the servo signal processor seek control processing procedure routine RT2, moves to step SP21 to wait for the seek command from CPU 2, and when receiving the command, moves to the following step SP22.

In step SP22, the servo signal processor 28 calculates the target speed of the thread motor 4 in accordance with the number of physical tracks for seek specified by the seek command, and moves to the following step SP23.

In step SP23, the servo signal processor 28 starts driving the thread motor 4 by giving the instruction on the number of physical tracks for seek and the target speed to the servo IC 23, and starts monitoring the count of pulse number and the pulse interval of the traverse signal TS, and then moves to the following step SP24.

In step SP24, the servo signal processor 28 determines whether the number of remaining trucks to be sought obtained by subtracting the pulse number count value from the number of physical tracks for seek is 0. When the affirmative result is obtained in step SP24, which means that the number of remaining trucks to be sought is 0 and the optical pickup 5 has reached the target, the servo signal processor 28 moves to step SP25 and transmits the notice of "seek completed" to CPU 2 and then terminates the processing in step SP28.

On the other hand, when the negative result is obtained in step SP24, which means that the number of remaining trucks to be sought is not 0 and the optical pickup 5 has not yet reached the target, the servo signal processor 28 moves to step SP26.

In step SP26, the servo signal processor 28 serving as the abnormality detecting means determines whether the pulse interval of the traverse signal TS is longer than the pulse interval threshold.

When the negative result is obtained in step SP26, which means that the pulse interval of the traverse signal TS is shorter than the pulse interval threshold and the signal skip error has not occurred, the servo signal processor 28 returns to step SP23 so as to continue seeking.

On the other hand, when the affirmative result is obtained in step SP26, which means that the pulse interval of the traverse signal TS longer than the pulse interval threshold and the signal skip error may have occurred, the servo signal processor 28 moves to step SP27, and discontinues driving the thread motor so as to stop the optical pickup 5. Then, after transmitting to CPU 2 the notice of "seek error generated" and the pulse number count value at this time as the number of trucks on which the optical pickup has moved, the servo signal processor 28 terminates the processing at step SP28.

(4) Operation and Effect

In the above described configuration, the optical disc device 1 according to an embodiment of the present invention, during the seek of the optical pickup 5, recognizes the number of trucks on which the optical pickup 5 has moved, based on the number of pulses of the traverse signal TS formed by binarizing the tracking error signal TE, and monitors the pulse interval of the traverse signal TS.

When the pulse interval of the traverse signal TS becomes longer than the pulse interval threshold, the optical disc device 1 stops the movement of the optical pickup 5 because there is a possibility that the seek error has occurred due to the signal skip, thereby preventing the track count miss caused by the signal skip and avoiding overrun of the optical pickup 5.

Further, the optical disc device 1, after recognizing the movement stopping position of the optical pickup 5, calculates the number of physical tracks for seek from the movement stopping position to the target and resumes seeking, thereby enabling the seek time to be shortened as compared with the case where the optical pickup 5 is returned to a reference position so as to restart seeking.

The optical disc device 1 according to the present invention, detects the seek error merely based on the pulse interval and temporarily stops seeking at the time of the occurrence of the seek error, and thereafter confirms the present position of the optical pickup 5 so as to resume seeking. This makes it possible to simplify the processing of CPU 2 and the servo signal processor 28, and to eliminate a complementing circuit and a high-performance servo signal processor which are required in the optical disc device in the past to detect the abnormality during the seek based on the frequency of the traverse signal, and to complement the traverse signal at the occurrence of abnormality so as to continue seeking.

According to the above described configuration, it is provided to prevent the occurrence of the track count miss due to the signal skip of the traverse signal and to avoid overrun of the optical pickup.

(5) Other Embodiment

In above described embodiment, CPU 2 and the servo signal processor 28 are arranged to cooperate with each other so as to perform the seek control of the optical pickup 5, but the present invention is not limited to the case, and either CPU 2 or the servo signal processor 28 may be arranged to independently perform the above described seek control, and further a control circuit configured by hardware may also be arranged to perform the above described seek control.

In above described embodiment, the pulse interval threshold is set to be 10 times the pulse interval of the traverse signal TS during the seek, but the present invention is not limited to the case, and the pulse interval threshold may be suitably increased or decreased in accordance with the characteristic of the optical disc device and the peripheral situation.

In above described embodiment, when the optical pickup 5 is temporarily stopped in accordance with the notice of the occurrence of the seek error so as to read out the present address, the spindle rotational speed is arranged to be changed in accordance with the estimated present address in the case where the driving method of the optical disc 100 is CLV (step SP12 in routine RT1), but the embodiment has a problem that it is time consuming to statically determine the spindle rotational speed.

For this reason, only at the time of reading out the address after the optical pickup 5 has been temporarily stopped by the occurrence of the seek error, even in the case where the driving method is CLV, the time required for reading out the address can be shortened and the seek time can be further reduced by arranging such that the spindle rotational speed is not changed but the read clock is changed so as to make the address read out.

In above described embodiment, the optical disc device for performing both recording and reproducing operation on the optical disc is described, but the present invention is not limited to the case, and the present invention may be applied to the optical disc device for performing either recording or reproducing operation.

The present invention is applicable to the optical disc device which performs recording and reproducing operation on the optical disc.

It should be understood by those skilled in the art that various modifications, combinations, sub-combinations, alterations and variations may occur depending on design requirements and other factors insofar as they are within the scope of the appended claims or the equivalents thereof.

What is claimed is:

1. An optical disc device comprising:
   an optical pickup for irradiating an optical disc with laser beam and detecting reflected light formed by the laser beam reflected by the optical disc so as to generate a received light signal;
   optical pickup driving means for driving the optical pickup in a radial direction of the optical disc;
   traverse signal generation means for generating a traverse signal forming a pulse at the optical pickup's crossing a track provided on the optical disc by binarizing the received light signal based on a predetermined binary threshold;
   movement control means for recognizing moving amount and moving speed of the optical pickup based on the traverse signal and for controlling the optical pickup driving means based on the recognition result so as to make the optical pickup seek to a target address of a seek destination; and
   abnormality monitoring means for sending an abnormality notice to the movement control means when pulse interval of the traverse signal becomes longer than a predetermined pulse interval threshold, wherein
   the movement control means temporarily stops the optical pickup in accordance with the abnormality notice,
   after temporarily stopping the optical pickup in accordance with the abnormality notice, the movement control means estimates a present address of a temporary stop position of the optical pickup based on a pulse number count value of the traverse signal when the pulse interval of the traverse signal becomes longer than the pulse interval threshold, changes a spindle rotational speed or read clock in accordance with the estimated temporary stop position, reads the present address of the estimated temporary stop position, and calculates a number of physical tracks for seeking to the target address of the seek destination based on the read present address and the target address of the seek destination.

2. A control device for controlling an optical pickup provided in an optical disc device, comprising:
   traverse signal generation means for generating a traverse signal forming a pulse at the optical pickup's crossing a track provided on the optical disc by binarizing a received light signal obtained from reflected light of a laser beam emitted to an optical disc based on a predetermined binary threshold;
   movement control means for recognizing moving amount and moving speed of the optical pickup based on the traverse signal and for making the optical pickup seek to a target address of a seek destination based on the recognition result;
   abnormality monitoring means for sending an abnormality notice to the movement control means when pulse interval of the traverse signal becomes longer than a predetermined pulse interval threshold, wherein
   the movement control means temporarily stops the optical pickup in accordance with the abnormality notice,
   after temporarily stopping the optical pickup in accordance with the abnormality notice, the movement control means estimates a present address of a temporary stop position of the optical pickup based on a pulse number count value of the traverse signal when the pulse interval of the traverse signal becomes longer than the pulse interval threshold, changes a spindle rotational speed or read clock in accordance with the estimated temporary stop position, reads a present address of the estimated temporary stop position, and calculates a number of physical tracks for seeking to the target address of the seek destination based on the read present address and the target address of the seek destination.

3. A method for controlling an optical pickup provided in an optical disc apparatus, comprising:
   generating, at the optical disc apparatus, a traverse signal forming a pulse at the optical pickup's crossing a track provided on the optical disc by binarizing, with a binarizing device, a received light signal obtained from reflected light of a laser beam emitted to an optical disc based on a predetermined binary threshold;
   recognizing, with a processing unit at the optical disc apparatus, moving amount and moving speed of the optical pickup based on the traverse signal so as to make the optical pickup seek to a target address of a seek destination;
   performing abnormality monitoring, with the processing unit at the optical disc apparatus, by monitoring pulse interval of the traverse signal for sending an abnormality notice when the pulse interval becomes longer than a predetermined pulse interval threshold;
   temporarily stopping, with the processing unit at the optical disc apparatus, the optical pickup in accordance with the abnormality notice;
   performing movement control, with the processing unit at the optical disc apparatus, after temporarily stopping the optical pickup in accordance with the abnormality notice, by estimating a present address of a temporary stop position of the optical pickup based on a pulse number count value of the traverse signal when the pulse interval of the traverse signal becomes longer than the pulse interval threshold, by changing a spindle rotational speed or read clock in accordance with the estimated temporary stop position, reading a present address of the estimated temporary stop position, and calculating a number of physical tracks for seeking to the target address of the seek destination based on the read present address and the target address of the seek destination.

4. An optical disc device comprising:

an optical pickup configured to irradiate an optical disc with laser beam and to detect reflected light formed by the laser beam reflected by the optical disc so as to generate a received light signal;

an optical pickup driver configured to drive the optical pickup in a radial direction of the optical disc;

a traverse signal generator configured to generate a traverse signal forming a pulse at the optical pickup's crossing a track provided on the optical disc by binarizing the received light signal based on a predetermined binary threshold;

a movement controller configured to recognize moving amount and moving speed of the optical pickup based on the traverse signal and to control the optical pickup driver based on the recognition result so as to make the optical pickup seek to a target address of a seek destination; and an abnormality monitor configured to send an abnormality notice to the movement controller when pulse interval of the traverse signal becomes longer than a predetermined pulse interval threshold, wherein the movement controller temporarily stops the optical pickup in accordance with the abnormality notice, the movement controller, after temporarily stopping the optical pickup in accordance with the abnormality notice, is configured to estimate a present address of a temporary stop position of the optical pickup based on a pulse number count value of the traverse signal when the pulse interval of the traverse signal becomes longer than the pulse interval threshold, to change a spindle rotational speed or read clock in accordance with the estimated temporary stop position, to read a present address of the estimated temporary stop position, and to calculate a number of physical tracks for seeking to the target address of the seek destination based on the read present address and the target address of the seek destination.

5. A control device for controlling an optical pickup provided in an optical disc device, comprising:

a traverse signal generator configured to generate a traverse signal forming a pulse at the optical pickup's crossing a track provided on the optical disc by binarizing a received light signal obtained from reflected light of a laser beam emitted to an optical disc based on a predetermined binary threshold;

a movement controller configured to recognize moving amount and moving speed of the optical pickup based on the traverse signal and to make the optical pickup seek to a target address of the seek destination based on the recognition result;

an abnormality monitor configured to send an abnormality notice to the movement controller when pulse interval of the traverse signal becomes longer than a predetermined pulse interval threshold, wherein the movement controller temporarily stops the optical pickup in accordance with the abnormality notice, the movement controller, after temporarily stopping the optical pickup in accordance with the abnormality notice, is configured to estimate a present address of a temporary stop position of the optical pickup based on a pulse number count value of the traverse signal when the pulse interval of the traverse signal becomes longer than the pulse interval threshold, to change a spindle rotational speed or read clock in accordance with the estimated temporary stop position, to read a present address of the estimated temporary stop position, and to calculate a number of physical tracks for seeking to the target address of the seek destination based on the read present address and the target address of the seek destination.

* * * * *